United States Patent [19]
Adachi

[11] Patent Number: 5,442,164
[45] Date of Patent: Aug. 15, 1995

[54] BAR CODE READER FOR READING TWO-DIMENSIONAL BAR CODES BY USING LENGTH INFORMATION DERIVED FROM A SENSED SIGNAL

[75] Inventor: Yutaka Adachi, Sagamihara, Japan

[73] Assignee: Olympus Optical Co., Ltd., Tokyo, Japan

[21] Appl. No.: 114,679

[22] Filed: Aug. 31, 1993

[30] Foreign Application Priority Data

Sep. 2, 1992 [JP] Japan ............................. 4-234734

[51] Int. Cl.6 ............................................. G06K 7/10
[52] U.S. Cl. .................................... 235/463; 235/462
[58] Field of Search ..................... 235/462, 463, 472

[56] References Cited

U.S. PATENT DOCUMENTS 3,723,710  3/1973  Crouse ................... 235/463
4,135,663  1/1979  Nojiri ..................... 235/463
4,147,295  4/1979  Nojiri ..................... 235/463
4,245,152  1/1981  Flurry .................... 235/463
4,421,978  12/1983 Laurer .................... 235/462
5,216,231  6/1993  Ouchi .................... 235/463
5,245,167  9/1993  Takenaka ................ 235/462
5,336,874  8/1994  Hasegawa ............... 235/466

Primary Examiner—Donald Hajec
Assistant Examiner—Karl D. Frech
Attorney, Agent, or Firm—Frishauf, Holtz, Goodman, Langer & Chick

[57] ABSTRACT

The image of a bar code on a bar code label is picked up by a linear sensor while scanning in the X and Y directions is performed by a stage. An analog video signal from this linear sensor is converted into digital data by an analog processor. The resulting digital video data is supplied to a counter unit, and the counter unit counts the lengths of bars and spaces constituting the bar code. These counted lengths of the bars and the spaces are stored in a memory. The content of the memory is decoded by a data processor constituted by a CPU or the like. The decoded result is supplied to, e.g., a host computer, thereby presenting the content of the information written on the bar code to an operator.

5 Claims, 9 Drawing Sheets

FIG. 2A                    FIG. 2B

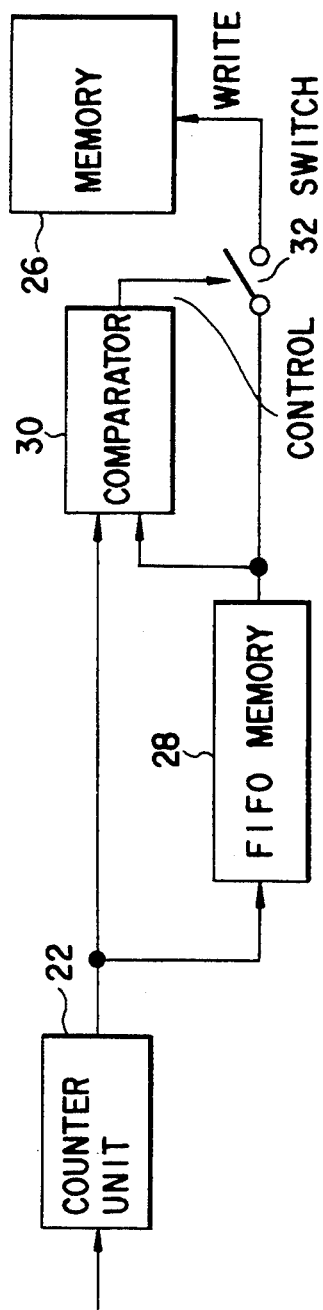
F I G. 5
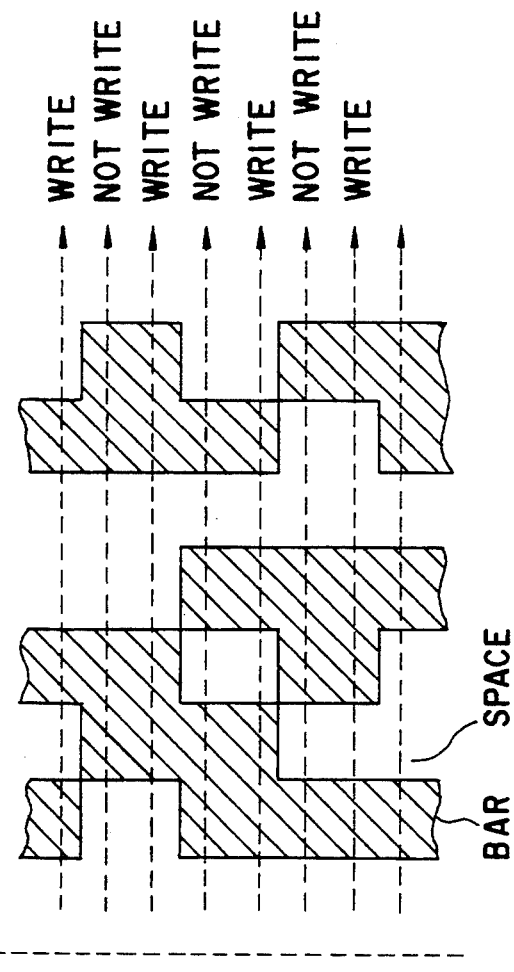
F I G. 6

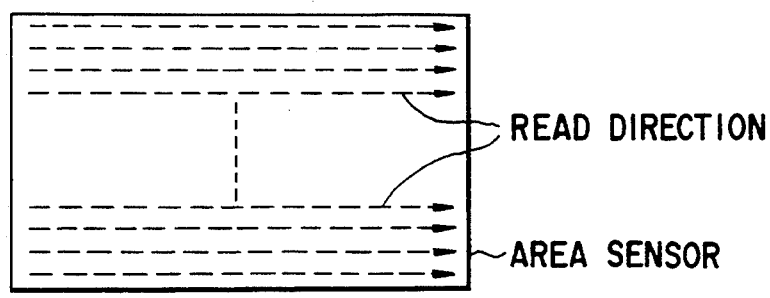
F I G. 13
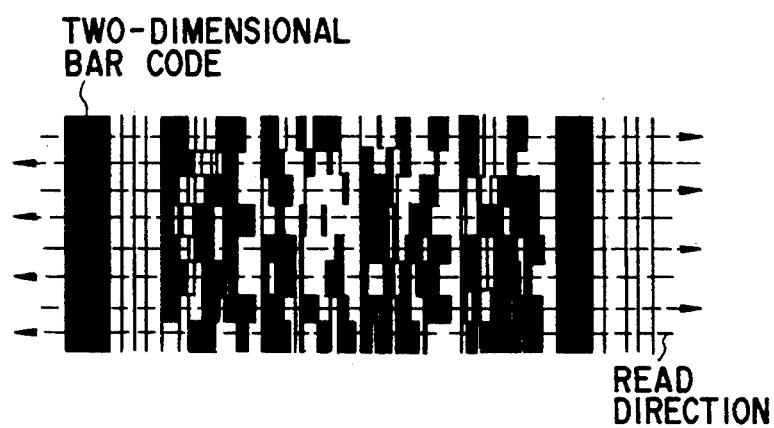
F I G. 14A
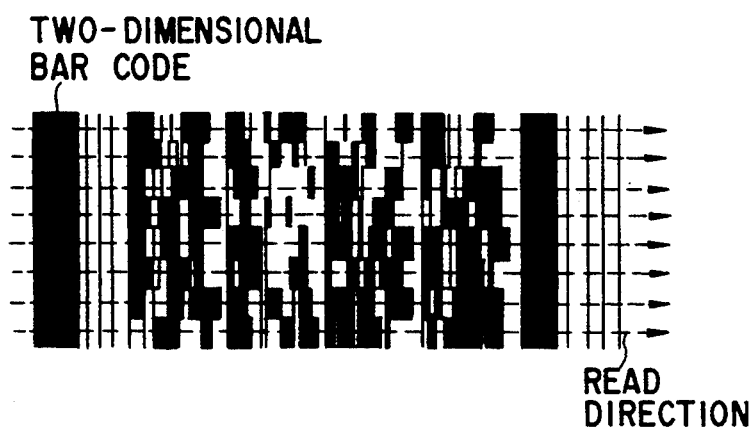
F I G. 14B

BAR CODE READER FOR READING TWO-DIMENSIONAL BAR CODES BY USING LENGTH INFORMATION DERIVED FROM A SENSED SIGNAL

BACKGROUND OF THE INVENTION

1. Field of the Invention

The present invention relates to bar code reader for reading bar code information and, ore particularly, to a bar code reader capable of storing bar codes in a memory while using only a small storage capacity.

2. Description of the Related Art

Several different types of bar codes have been conventionally used in the management of, e.g., various goods and baggages, and recently bar codes called 'two-dimensional bar codes' are beginning t be put into practical use. Information is recorded in two directions, i.e., the row and column directions in these two-dimensional bar codes, whereas information is written in only one direction in convention bar codes, i.e., one-dimensional bar codes. The two-dimensional bar codes, therefore, have storage capacities larger than those of the conventional bar codes. FIG. 1A shows a JAN code as an example of the convent bar codes, and FIG. 1B shows a PDF417 code as an e of the two-dimensional bar codes. Code16K, DATA CODE, and Vericode are also known as the two-dimensional bar codes in addition to the PDF417.

The following system has been conventionally used as a method of reading these two-dimensional bar codes. That is, the bar code of a bar code label is first imaged by an imaging unit, such as a CCD, through an optical system, and the resulting output signal is then supplied to an analog processor. The analog processor performs, e.g., amplification, sample-and-hold, and analog-to-digital conversion for the signal, and supplies information about the reflection luminances of bars and spaces of the bar code image to a frame memory, as digital information. A data processor constituted by, e.g., a CPU decodes the bar code information by using the information of the frame memory. The decoded bar code information is supplied to a host computer or the like and is thereby presented to operator.

The decoding method performed by he data processor will be described below. First, the data processor determines whether the image data obtained through imaging is part of a bar or a space. The data processor determines this while tracing the image data in the frame memory in the direction of the Ted of bar code information, thereby obtaining the relationship in distance between bars and spaces. Using this relationship, the data processor decodes the bar code in accordance with the symbology (symbol standard) of that bar code.

The imaging unit of the above CCD or the like can be realized by either a linear sensor (1DCCD) in which imaging elements are arranged on a line or an area sensor (2DCCD) in which imaging elements are arranged in an area. When the linear sensor is used, it is necessary to trace an imaging area on a bar code to thereby pick up the image information of the whole par code. In the case of the area sensor, it is possible to read a whole bar code image at once because the whole bar code image can be picked up by an imaging area.

The number of pixels of a currently, widely used area sensor is about 380,000 in the case of the 2DCCD. Generally, the arrangement of these 380,000 pixels is 768 pixels×493 pixels (rows×columns). Area sensors with larger numbers of pixels are of course available, but they are very expensive. Since, however, area sensors with this 380,000-pixel arrangement are also relatively expensive, inexpensive scanners (bar code readers) are difficult to manufacture when considering the use of these area sensors.

In addition, in accordance with the sampling theorem, an image of each minimum module of a bar code present on the object surface of an optical system must be formed on an area with at least two pixels, ideally; five to ten pixels on an area sensor of an image plane. (The minimum modules are minimum units constituting bars and spaces, and areas as shown in FIG. 1C are the minimum modules.) For this reason, area sensors with the 380,000-pixel arrangement, in which the number of pixels in the row direction is small, cannot read two-dimensional bar codes with high densities and large dimensions. These area sensors are therefore not so practical.

To solve these problems, the use of linear sensors which are inexpensive and have large numbers of pixels is advantageous. The frame memories as described above, however, are necessary even when these linear sensors are used. As an example, storing image data of 500 lines by using a linear sensor with 2,048 pixels requires a memory capacity of about 1M words. Since a memory with a high access speed is required to shorten the decoding time, this type of a memory, with a capacity of 1M words, becomes expensive.

As described above, it has been difficult for the conventional techniques to manufacture inexpensive two-dimensional bar code readers.

SUMMARY OF THE INVENTION

The present invention has been made in consideration of the above situation, its object being to provide a bar code reader which requires only a small memory capacity to decode bar code information and is consequently inexpensive.

In order to achieve the above object, a bar code reader according to the present invention comprises a sensor for sensing a bar code, replacing means for replacing a sensed signal of the bar code in a direction of an array of bars and spaces, which is supplied successively from the sensor, with length information of the bars and the spaces, and a memory for storing the length information output from the replacing means as data to be decoded.

That is, according to the bar code reader of the present invention, the sensed signal of a bar code in the direction of the array of bars and spaces, which is output successively, from the sensor, is stored in the memory not directly, but after being replaced with the information concerning the lengths of the bars and the spaces. This makes the use of a memory with a small memory capacity possible, thereby providing an inexpensive bar code reader.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A to 2C are views for explaining the length information of the image information of a bar code required for decoding;

FIG. 5 is a block diagram showing an arrangement for storing only data obtained by one scan operation in a memory when one row of a two-dimensional bar code is scanned and read a number of times;

FIG. 6 is a view showing the results of a scan to be stored in the memory;

FIG. 13 is a view showing the reading direction of an area sensor when the area sensor is used in place of the linear sensor shown in FIG. 4; and FIGS. 14A and 14B are views each showing a reading direction when a laser scanner is used.

DETAILED DESCRIPTION OF THE PREFERRED EMBODIMENTS

Before an explanation of the embodiments of the present invention, the concept of the present invention will be described first for better understanding of the invention.

Figure 2C:
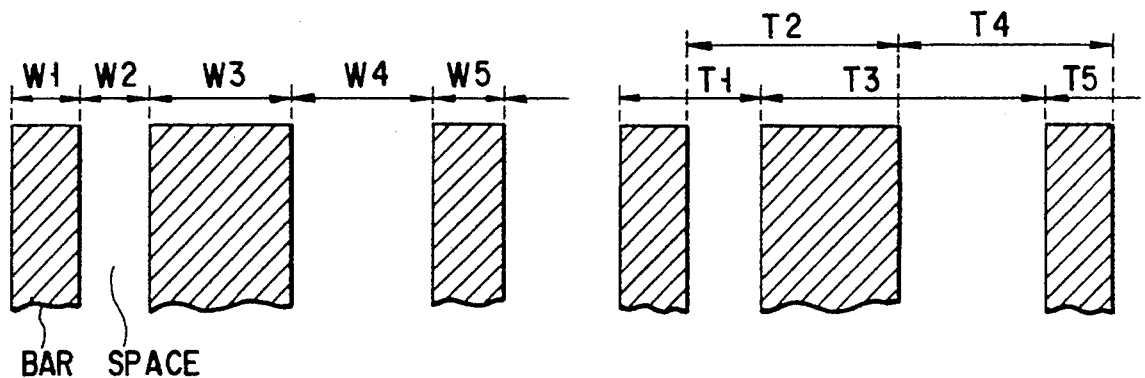
Figure 2C:
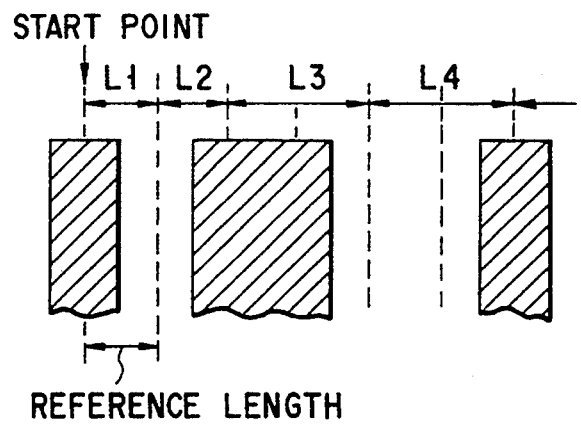

Generally, the information of a bar code required to decode the bar code is length information, and this length information is roughly classified into what may be seen in FIGS. 2A to 2C.

The length information shown in FIG. 2A represents the lengths of bars and spaces as Wn in sequence.

The length information shown in FIG. 2B represents the distance from one edge at which a space changes to a bar to the next edge and the distance from one edge at which a bar changes to a space to the next edge as Tn in sequence.

The length information shown in FIG. 2C represents the lengths of bars and spaces as follows. That is, a reference length is set in advance, and, if a point traced by the reference length from the start point of a bar illustrated in FIG. 2C is, for example, a space, then this length is adopted as L1. Subsequently, if a point traced by the reference length from the point of this space is a bar, this length is adopted as L2. If, however, a point traced next by the reference length from the point of this bar is also a bar, then this length is not adopted and a point further traced by the reference length from this point is checked. If the next point checked in this manner is a space, the length to this point is adopted as L3. This processing is repeatedly executed to represent the lengths of bars and spaces as Ln.

The length information of the type as shown in FIGS. 2A and 2B is used primarily in bar codes such as PDF471 and Code16K. The length information of the type as shown in FIG. 2C, on the other hand, is used principally in bar codes such as DATA CODE and Vericode. These two types of the length information have a common characteristic in that the image data itself of the bar code is not particularly required although the length information of bars or spaces is necessary. That is, the memory capacity can be reduced greatly by storing only the length information of bars or spaces in a frame memory, instead of storing the image data in the memory.

Figure 3:
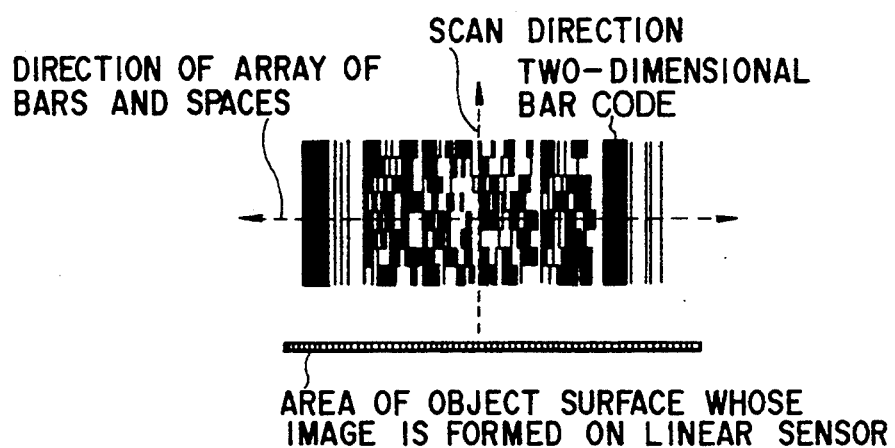
FIG. 3 is a view for explaining a scan operation when a linear sensor is used.

A linear sensor is used as a bar code image reading device. To read a whole two-dimensional bar code using the linear sensor, the area of an object surface whose image is formed on the linear sensor must be scanned as indicated by an arrow shown in FIG. 3. This area is kept parallel to the direction of the array of bars and spaces because the lengths of the bars and the spaces are read from their respective images formed on the linear sensor. To realize this scan, a stage or an optical system on which the bar code is placed need only be moved relative to the area of the object surface whose image is formed on the linear sensor in a direction perpendicular to the array direction of the area. The movement of the area as shown in FIG. 3 can also be realized by arranging an optical element, such as a mirror, on an optical axis and rotating the optical axis by moving this mirror.

The embodiments of the present invention will be described below with reference to the accompanying drawings.

Figure 4:
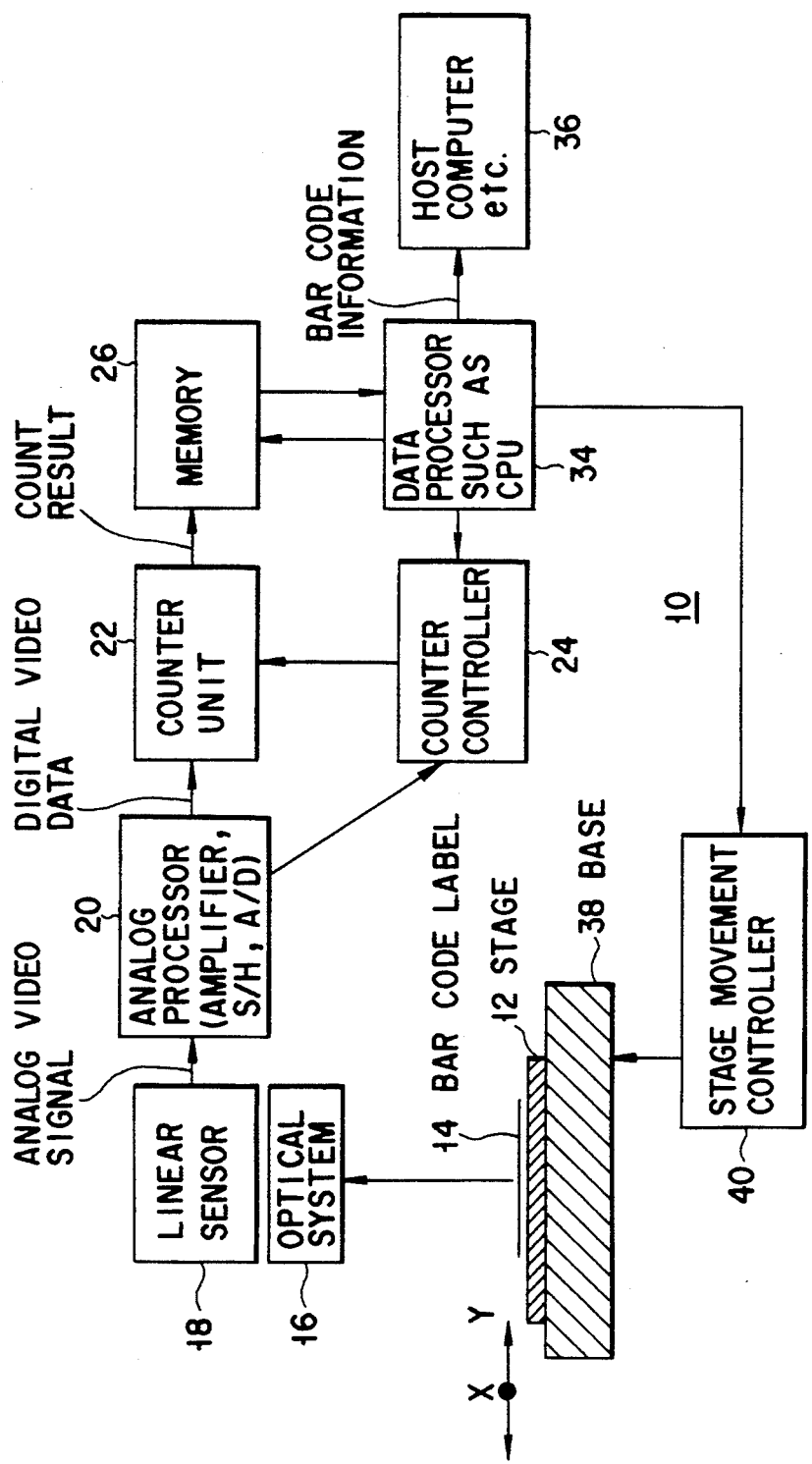
FIG. 4 is a block diagram showing a bar code reader according to the first embodiment of the present invention.

FIG. 4 is a block diagram showing the overall arrangement of a bar code reader 10 according to the first embodiment of the present invention.

Referring to FIG. 4, an optical system 16 forms an image of the bar code of a bar code label 14 pasted on, e.g., a card, a sheet, or an object placed on a stage 12, and a linear sensor 18 picks up this bar code image. The consequent luminance information representing bars and spaces of the bar code image is read out in the form of an analog video signal from the linear sensor 18. This luminance signal is supplied to an analog processor 20 including, e.g., an amplifier, a sample-and-hold (S/H) circuit, an analog-to-digital converter (A/D), and is then converted into digital video data by the analog processor 20. This digital video data is supplied to a counter unit 22. The counter unit 22 counts Wn, Tn, or Ln shown in FIG. 2A, 2B, or 2C, respectively. This count operation is controlled by a counter controller 24. The method of this count operation will be described in detail later. The count result of Wn, Tn, or Ln is stored in a memory 26.

When one row of a two-dimensional bar code is scanned and read a plurality of times, the length of one bar or one space is also counted a plurality of times. It is not necessary to store all this identical data supplied in succession in the memory 26, but only the data of one scan need be stored.

FIG. 5 shows a practical example of this method. Referring to FIG. 5, the output count result from the counter unit 22 is supplied to a FIFO (First In First Out) memory 28 and a comparator 30. The FIFO memory 28 has a capacity for storing the count result of one scan operation. The output from the FIFO memory 28 is supplied directly to the comparator 30 and also written in the memory 26 via a switch 32 which is opened/closed in accordance with a control signal output from the comparator 30. The comparator 30 outputs the control signal for closing the switch 32 only when the count result of one scan operation supplied from the counter unit 22 is different from the count result of one line obtained by the immediately preceding scan operation, which is supplied from the FIFO memory 28. In this case, even if a slight difference (of, e.g., several points) is present between the count results, it is more practical to determine if the count results are the same assuming that a slight counting error exists.

That is, in the above arrangement, a count result output from the counter unit 22 during a certain scan operation is written in one terminal of the FIFO memory 28. At the same time, the comparator 30 compares this count result with a count result obtained by the immediately preceding scan operation and output from the other terminal of the FIFO memory 28. When the same row is scanned in succession, the result of comparison obtained by the comparator 30 indicates that two count results are identical with each other. When different rows are scanned, different count results are obtained. If identical count results are obtained, the count result of the next scan from the counter unit 22 is written in one terminal of the FIFO memory 28, but the output count result from the other terminal of the FIFO memory 28 is not written in the memory 26. If different count results are obtained, the count result of the next one scan from the counter unit 22 is written in one terminal of the FIFO memory 28, and the output count result from the other terminal of the FIFO memory 28 is written in the memory 26 via the switch 32. The count result written in the memory 26 at this point is the data of the immediately preceding scan already written in the FIFO memory 28. Consequently, as shown in FIG. 6, when the same row is scanned a plurality of times, only the count result obtained by the first scan operation is written in the memory 26 during the second scan operation.

Referring back to FIG. 4, the content of the memory 26 is decoded by a data processor 34 constituted by, e.g., a CPU. This decoded result is supplied to a host computer 36 or the like to present the content of information written in the bar code to an operator. The data processor 34 can also be constituted by a DSP (digital signal processor) or the like.

In order for the linear sensor 18 to read a two-dimensional bar code, an area, whose image is to be formed on the linear sensor 18, must be scanned as shown in FIG. 3. For this purpose, the bar code reader 10 of this embodiment moves the bar code label 14 in an XY plane. To move the bar code label 14, a card, a sheet, an object, or the like on which the bar code label 14 is pasted is fixed on the stage 12. The stage 12 is so designed as to freely move on a base 38. The movement of the stage 12 is controlled by a stage movement controller 40. The stage movement controller 40 receives a control signal indicating the timing of the movement of stage 12, from the data processor 34 constituted by a CPU or the like. The stage 12 may be moved by a step method in which it is moved in synchronism with the reading of one line or by an equal speed method in which it is moved at a constant speed.

Figures 7, 8:
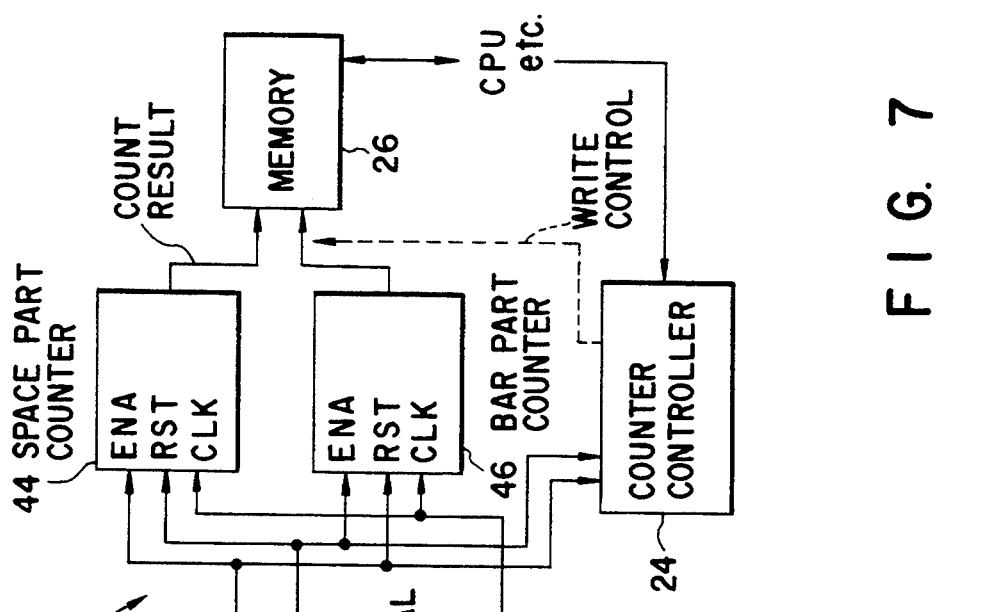
FIG. 7 is a block diagram showing the arrangement of a counter unit according to the first embodiment.
FIG. 8 is a view showing an example of a state in which the lengths of spaces and bars of the bar code as shown in FIG. 2A are written in the memory.

FIG. 7 is a block diagram showing a practical arrangement for counting the lengths of bars and spaces as shown in FIG. 2A.

In the analog processor 20 described above, the analog video signal processed by the amplifier, the S/H, and the like is supplied to an A/D converter 20A. If the length information to be stored in the memory 26 consists of bars and spaces, a binarizing circuit can be used as the A/D converter 20A. If the luminance information indicating intermediate portions between bars and spaces is also to be stored, an A/D converter for several bits is applicable. For the sake of simplicity in explanation, the following description will be made assuming that the A/D converter 20A is a binarizing circuit.

The output from the A/D converter 20A of the analog processor 20 is supplied to the counter unit 22. In the counter unit 22, the digital video data from the A/D converter 20A is supplied to a space/bar state determining unit 42. The space/bar state determining unit 42 determines whether the input image data is part of a bar or a space. As an example, since the reflectivity of a space portion is larger than that of a bar portion, the space/bar state determining unit 42 determines that the data indicates a space, if the level of a luminance signal is high (if the reflected light amount is large), and determines that the data indicates a bar, if the level of a luminance signal is low (if the reflected light amount is small).

The output from the space/bar state determining unit 42 is supplied to a space part counter 44 and a bar part counter 46. Terminals ENA, RST, and CLK of each counter represent an enable input, a reset input and a clock input, respectively. Each counter starts counting in accordance with video signal transfer clocks applied to the terminal CLK when the terminal ENA is "High" and the terminal RST is "Low". That is, the counters 44 and 46 count up in accordance with the input transfer clocks. When the terminal RST is "High", neither counter performs counting.

If the video data transferred from the A/D converter 20A indicates a space, the space signal and the bar signal from the space/bar state determining unit 42 go "High" and "Low", respectively. If, in contrast, the video data indicates a bar, the space signal and the bar signal go "Low" and "High", respectively. As a result, if the transferred video data indicates a space part, the space part counter 44 alone, counts up in accordance with the video signal transfer clocks. Conversely, if the transferred video data indicates a bar part, the bar part counter 46 alone, counts up in accordance with the video signal transfer clocks.

If the space/bar state determining unit 42 determines that the space part or the bar part has ended; the count-up is stopped, and the count result is written in the memory 26. After the count result is written, the counters 44 and 46 are reset to prepare for the next count operation. The counter controller 24 controls these count operations, FIG. 8 shows a practical example of the stored content of the memory 26, which indicates the length information of spaces and bars of the bar code as shown in FIG. 2A. Referring to FIG. 8, there is no discrimination between a bar and a space in the length information written in the memory 26. Since, however, whether the first data indicates a bar or a space is determined by the symbology (bar code standard) of each bar code, it is easy to check in a decoding operation whether the first data is a bar or a space. After determining the first data, whether information is a bar or a space can be determined easily in an order as shown in FIG. 8.

It is of course possible to add information indicating the state of a bar and a space to the length information. When the length information is represented by binary numbers, for example, a practical method of adding such bar/space state information is to represent the bar/space state information such that if the most significant bit of data is "1", the data indicates a bar, and, if the most significant bit of data is "0", the data indicates a space.

Figure 9:
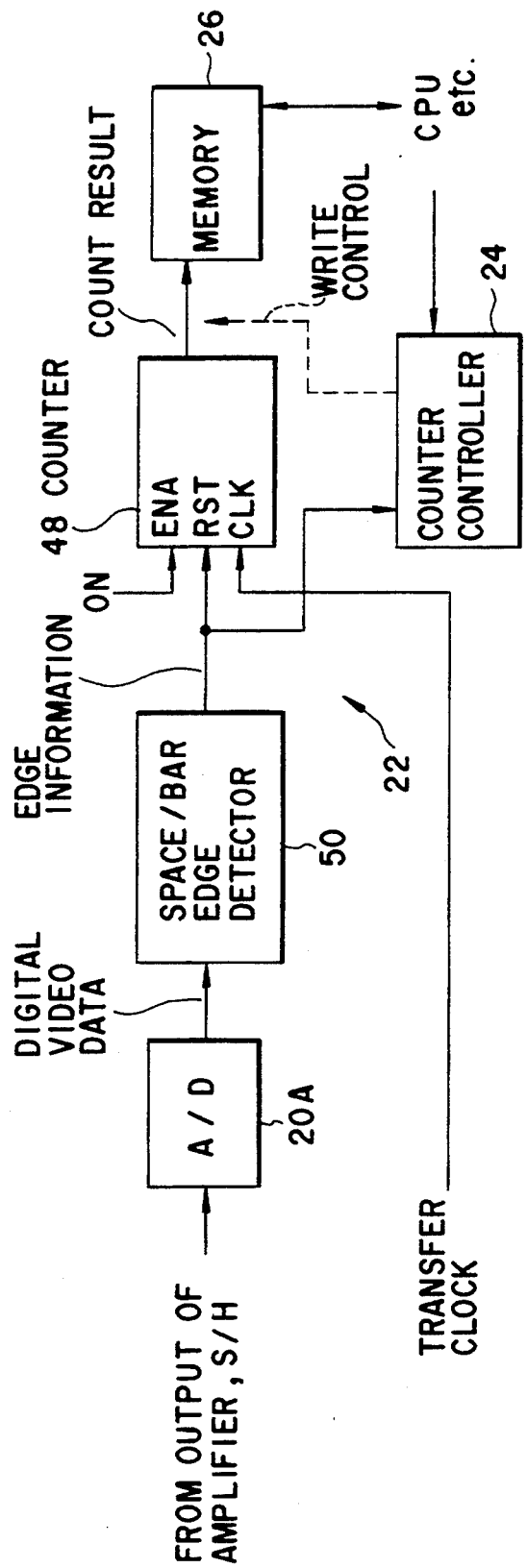
FIG. 9 is a block diagram showing the arrangement of a counter unit according to the second embodiment of the present invention.

The second embodiment of the present invention will be described below with reference to FIG. 9.

The first embodiment shown in FIG. 7 has the two types of counters for spaces and bars. As in the second embodiment of the present invention shown in FIG. 9, however, a counter unit 22 can also be constituted by a single counter 48 for both spaces and bars. In this arrangement, the space/bar state determining unit 42 shown in FIG. 7 is replaced with a space/bar edge detector 50. The other arrangement of this second embodiment is the same as that of the first embodiment described above.

In the arrangement shown in FIG. 7, the counter 44 counts when a space is detected, and the counter 46 counts when a bar is detected. In the arrangement shown in FIG. 9, distances each from one edge between a space and a bar to the next edge are counted. That is, counting is started when one edge between a space and a bar is detected. When the next edge between a space and a bar is detected, the count result is stored in a memory 26 and at the same time the counter 48 is initialized, starting the next count.

The third embodiment of the present invention will be described below with reference to FIG. 10.

Figure 10:
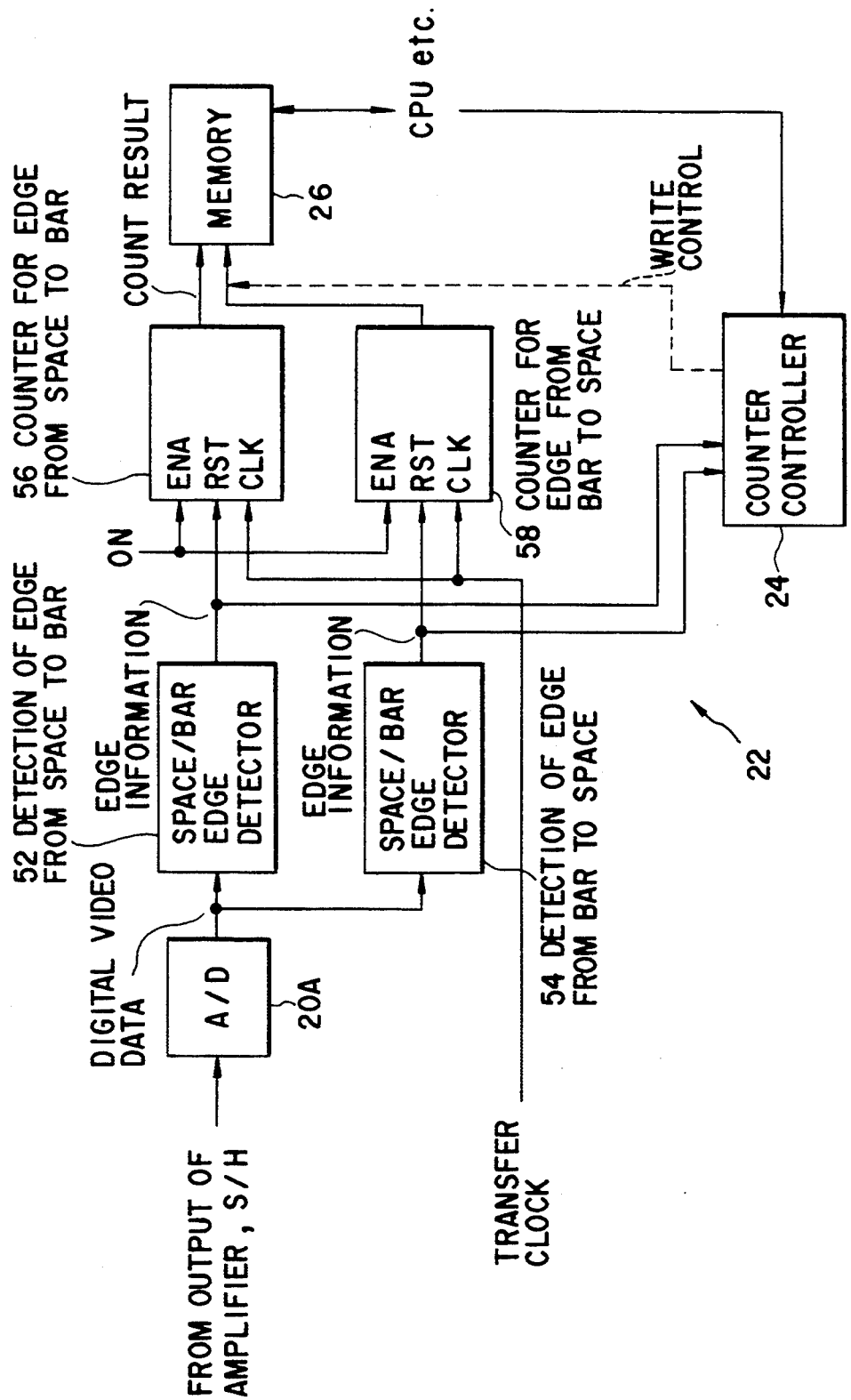
FIG. 10 is a block diagram showing the arrangement of a counter unit according to the third embodiment of the present invention.

FIG. 10 is a block diagram showing a counter unit 22 according to the third embodiment of the present invention. This counter unit 22 counts the lengths of bars and spaces as shown in FIG. 2B. The third embodiment is different from the second embodiment shown in FIG. 9 in that the space/bar edge detector 50 shown in FIG. 9 is divided into an edge detector 52 for detecting an edge at which a space changes to a bar and an edge detector 54 for detecting an edge at which a bar changes to a space, and that a counter unit is also divided into two systems (56 and 58) of counters. The other arrangement of this third embodiment is the same as that of the second embodiment.

In the arrangement shown in FIG. 10, one counter system counts distances each from one edge at which a space changes to a bar to the next edge, and the other counter system counts distances each from one edge at which a bar changes to a space to the next edge. In each counter system, therefore, the counter starts counting when an edge in a direction corresponding to that system is detected, and, when an edge in the same direction is detected, next, the count result is stored in a memory 26 and the counter is initialized, thereby restarting the count.

The fourth embodiment of the present invention will be described below with reference to FIG. 11.

Figure 1A:
FIG. 1A is a view showing a JAN code as an example of conventional bar codes.
Figure 1B:
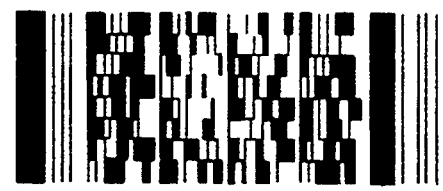
FIG. 1B is a view showing a PDF417 code as an example of two-dimensional bar codes.
Figure 1C:
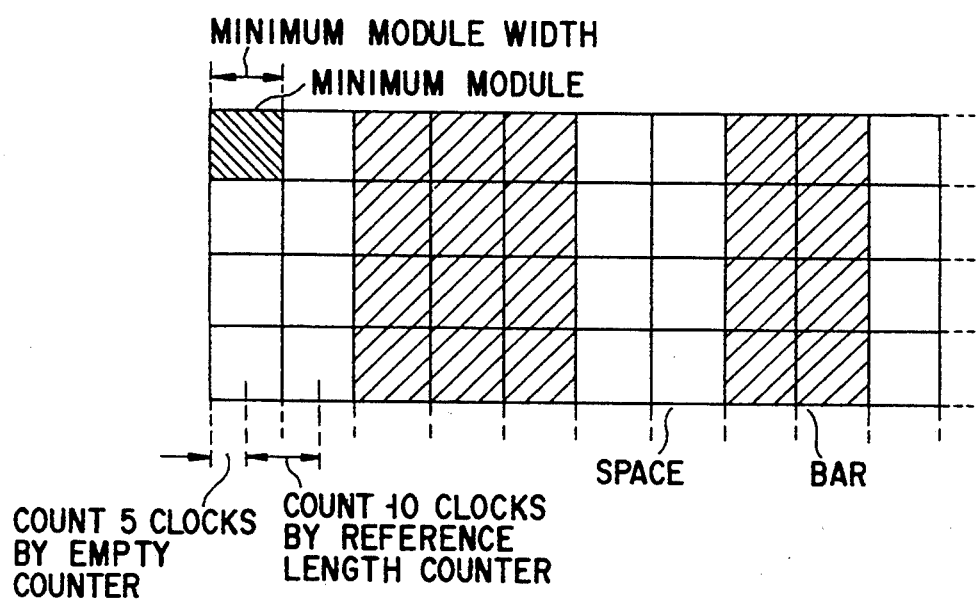
FIG. 1C is a view for explaining a minimum module width.
Figure 11:
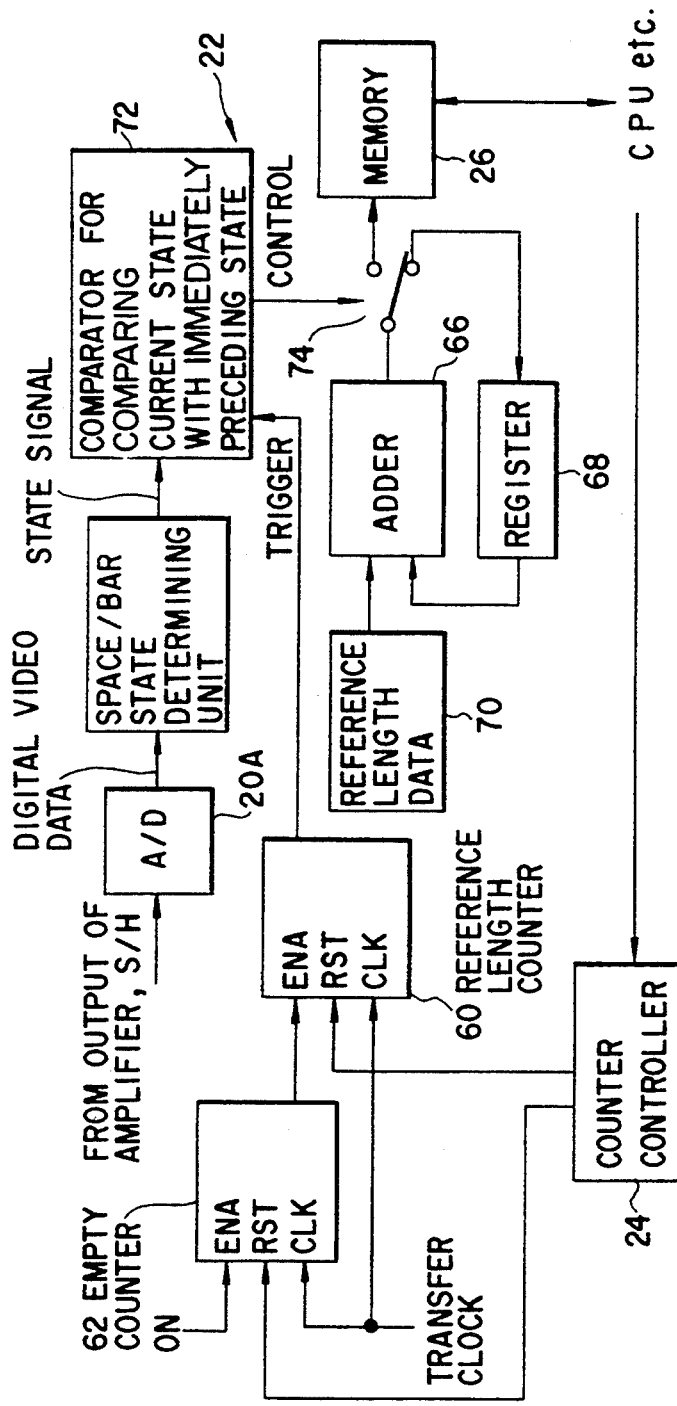
FIG. 11 is a block diagram showing the arrangement of a counter unit according to the fourth embodiment of the present invention.

FIG. 11 is a block diagram showing a counter unit 22 according to the fourth embodiment of the present invention. This counter unit 22 counts the lengths of bars and spaces as shown in FIG. 2C. In this fourth embodiment, the length information of spaces or bars is obtained by the use of the concept of minimum modules. The minimum modules are minimum units constituting bars and spaces, and the areas as shown in FIG. 1C are the minimum modules, The length constituting a space or a bar can be represented by the number of these minimum modules. Whether a given minimum module is a space or a bar can be determined by detecting reflection intensity information substantially at the center of this minimum module.

This central point can be calculated by a reference length counter 60 for counting minimum module widths. Assume, for example, that ten transfer clocks are set for image information corresponding to a minimum module width. In this case, as shown in FIG. 1C, an empty counter 62 counts five clocks from the end of a bar code, and then a reference length counter 60 starts counting. This reference length counter 60 is designed to output a signal when it counts ten clocks. The output digital video data from an A/D converter 20A at the time this signal is output is video information substantially indicating the center of the minimum module.

Figure 12:
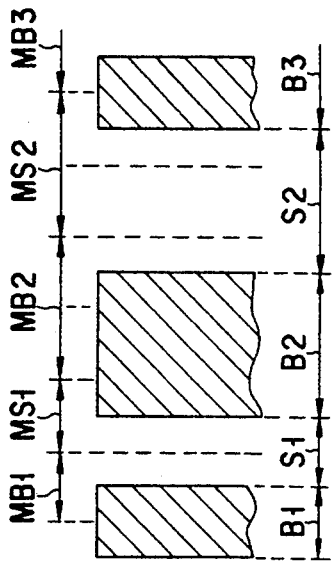
FIG. 12 is a view for explaining length information obtained by the counter unit shown in FIG. 11.

In this embodiment, a space/bar state determining unit 64 determines whether the digital video data from the A/D converter 20A is a space or a bar. An adder 66 adds the content of a register 68 and the reference length from a reference length data holding unit 70. The initial value of this register 68 is "0". The signal from the reference length counter 60 is supplied as a trigger to a state comparator 72 for comparing a current state with an immediately preceding state. The state comparator 72 compares a state in which an immediately preceding trigger signal is input with a state in which a current trigger signal is input. If the two states are the same (i.e., if two spaces or two bars are detected), the state comparator 72 closes a switch 74 to the side of the register 68 by using a control signal, writing the addition result from the adder 66 in the register 68. If, on the other hand, the immediately preceding state is different from the current state (i.e., if a space and a bar or a bar and a space are detected), the addition result from the adder 66 is written in a memory 26 via the switch 74, and the content of the register 68 is reset. With this operation, as shown in FIG. 12, information MSn and MBn, instead of information Sn and Bn indicating the lengths of bars and spaces, can be stored in the memory 26.

The present invention is not limited to the first to the fourth embodiments described above.

As an example, the relative movement between the bar code and the linear sensor 18 need not be obtained by moving the stage 12 but can be obtained by moving the linear sensor 18. Alternatively, an operator may hold a card, on which the bar code label 14 is pasted, with his or her hand and slide the card along a guide.

In addition, the arrangement of the counter unit 22 constituted by, e.g., the space/bar state determining units 42 and 64, the edge detectors 50 to 54, and the counters 44 to 48 and 56 to 62 can be realized by both hardware and software.

Furthermore, although the linear sensor is used in each of the above embodiments, the present invention can be practiced similarly by using an area sensor in place of the linear sensor. Commonly, the outputs of individual imaging elements are read out from the area sensor as shown in FIG. 13. Therefore, by using these outputs as the analog video signal shown in FIG. 4, the entire surface of a bar code can be scanned without moving the bar code and the sensor or an optical system relative to each other. Such use of the area sensor can also make the use of the base 38 or the stage 12 shown in FIG. 4 unnecessary.

Moreover, it is also possible to obtain a time-series output by scanning, using a laser scanner or the like, an area constituted by sides shorter than the width of a narrow bar or a narrow space as shown in FIGS. 14A and 14B and calculating the reflection intensity, and to use this time-series output as the analog video signal shown in FIG. 4. If the read directions are different as shown in FIG. 14A, an order of data storage into the memory 26 in FIG. 9 is changed for each scan operation. The result is equivalent to that obtained in the read direction as shown in FIG. 14B.

Note that the present invention is of course applicable to bar code readers for reading one-dimensional bar codes, such as conventional JAN codes.

According to the present invention as has been described above in detail, there can be provided a bar code reader requiring only a small memory capacity to perform processing up to the decoding of bar code information.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

what is claimed is:

1. A bar code reader comprising:
   a sensor for sensing a two-dimensional bar code, said sensor including a linear sensor arranged in a direction of an array of bars and spaces of the two-dimensional bar code and moved relative to the two-dimensional bar code in a direction perpendicular to the direction of the array of bars and spaces of the two-dimensional bar code, said linear sensor sensing each row of the two-dimensional bar code a plurality of times;
   replacing means for replacing a sensed signal of the bar code in a direction of an array of bars and spaces, which is supplied successively from said sensor, with length information of the bars and the spaces, said replacing means including row replacing means for replacing the sensed signal of the two-dimensional bar code in the direction of the array of bars and spaces, which is supplied successively from said linear sensor, with length information of the bars and the spaces once for each row of the two-dimensional bar code;
   a memory for storing the length information output from said replacing means as data to be decoded; and
   said row replacing means includes:
      length information replacing means for replacing the sensed signal of the two-dimensional bar code in the direction of the array of bars and spaces, which is supplied successively from said linear sensor, with the length information of the bars and the spaces;
      holding means for holding the length information of one row replaced by said length information replacing means until said length information replacing means finishes replacement of the next row;
      comparing means for comparing the length information of one row replaced by said length information replacing means with the length information of one row held by said holding means; and
      means for storing the length information of one row held by said holding means into said memory only when the comparison result of said comparing means indicates that the two compared length information do not agree with each other.

2. A bar code reader comprising:
   a sensor for sensing a bar code;
   replacing means for replacing a sensed signal of the bar code in a direction of an array of bars and spaces, which is supplied successively from said sensor, with length information of the bars and the spaces, the length information of the bars and the spaces being indicated by a number of predetermined minimum modules; and
   a memory for storing the length information output from said replacing means as data to be decoded.

3. The bar code reader according to claim 2, wherein said replacing means includes:
   counting means for counting a timing at which a center of the minimum module is substantially detected and for outputting a trigger signal;
   space/bar state determining means for determining whether the sensed signal of the bar code from said sensor corresponds to part of a space or a bar;
   comparing means for comparing, in accordance with the trigger signal from said counting means, a state determination result from said space/bar state determining means with a state determination result obtained when an immediately preceding trigger signal is supplied; and
   control means for incrementing the number of minimum modules and holding the incremented number when a comparison result of said comparing means indicates that the two state determination results are the same, and writing the number of held minimum modules into said memory when the comparison result indicates that the two state determination results are different.

4. The bar code reader according to claim 3, wherein said counting means includes:
   empty counter means for counting a number corresponding to a half length of the minimum module;
   reference length counter means for counting a number corresponding to the length of the minimum module; and
   count control means for first causing said empty counter means to count the number corresponding to the half length of the minimum module, then causing said reference length counter means to repeatedly count the number corresponding to the length of the minimum module, and outputting the trigger signal each time said reference length counter means counts the number corresponding to the length of the minimum module.

5. The bar code reader according to claim 3, wherein said control means includes:

register means for holding a numerical value;

reference length holding means for holding a numerical value corresponding to the length of the minimum module;

adding means for adding the numerical value held in said register means and the numerical value held in said reference length holding means; and means for causing said register means to hold the addition result from said adding means when the comparison result of said comparing means indicates that the two state determination results are the same, and writing the addition result from said adding means into said memory when the comparison result indicates that the two state determination results are different.

* * * * *